United States Patent [19]
Ward et al.

[11] Patent Number: 5,323,239
[45] Date of Patent: Jun. 21, 1994

[54] SIGNAL CORRECTION FOR COMPOSITE TRIPLE BEAT IMPAIRMENTS

[75] Inventors: Rabab K. Ward; Pingnan Shi, both of Vancouver, Canada

[73] Assignee: The University of British Columbia, Vancouver, Canada

[21] Appl. No.: 59,387

[22] Filed: May 11, 1993

[51] Int. Cl.$^5$ .............................................. H04N 5/21
[52] U.S. Cl. ..................... 348/607; 348/571
[58] Field of Search ............... 358/167, 166, 86, 139; 455/295, 296, 67.3; 375/99, 51; H04N 17/00, 5/21

[56] References Cited

U.S. PATENT DOCUMENTS

| | | | |
|---|---|---|---|
| 3,898,566 | 8/1975 | Switzer | 455/67.3 |
| 4,520,507 | 5/1985 | Moon | 455/3 |
| 4,677,390 | 6/1987 | Wagner | 330/149 |
| 4,995,104 | 2/1991 | Gitlin | 455/295 |
| 5,073,822 | 12/1991 | Gumm | 358/139 |
| 5,130,664 | 7/1992 | Pavlic et al. | 358/86 |
| 5,162,900 | 11/1992 | Citta | 358/86 |
| 5,172,068 | 12/1992 | Childs | 328/162 |

Primary Examiner—Mark R. Powell
Assistant Examiner—Chris Grant
Attorney, Agent, or Firm—C. A. Rowley

[57] ABSTRACT

A method for reducing the effect of a composite triple beat (CTB) of a visual image is obtained by digitizing the signal for the image frame, dividing the digital signal into a plurality of stripes extending perpendicular to the horizontal lines of the image to form subpictures and determining the average intensity of the signal in each of the horizontal lines of each of the subpictures. An average value for each of the lines in each of the subpictures is then obtained and the component of the signal forming the composite triple beat signal for each line of each subpicture is estimated. Then the estimated triple beat signal is subtracted from its corresponding portion of the digitized signal to provide corrected subpictures. The corrected subpictures are then recombined to form a clean signal providing the cleaned visual image. In a preferred arrangement plurality of consecutive frames are treated as above described to provide average corrections for each line based on the average for the corresponding lines in the subpictures in the plurality of frames and then the subpictures for the frame to be shown next are corrected using the average corrections values to provide an even clearer signal.

8 Claims, 5 Drawing Sheets

SIGNAL CORRECTION FOR COMPOSITE TRIPLE BEAT IMPAIRMENTS

FIELD OF THE INVENTION

The present invention relates to a method of substantially removing the visual effect of a composite triple beat (CTB) in a cable television signal.

BACKGROUND OF THE PRESENT INVENTION

Composite triple beat (CTB) impairments, one of the major impairments in cable television, are known to be caused by the non-linearity of amplifiers in the cable distribution network. Composite triple beats (CTB) manifest themselves as horizontal streaking patterns on the picture and are extremely irritating to viewers, to the extent that the threshold of perceptibility is found to be significantly higher than other noise levels (currently the CTB is noticeable at readings about 57 dB in terms of carrier-to-CTB noise ratio (CNR)).

When a number of different channels are transmitted simultaneously through the same cable network, these signals must be amplified at various locations along the network and since the amplifiers are not ideally linear, third-order distortion inevitably occurs forming what is known as third-order intermodulation beat products having frequencies that are combinations of the carrier frequencies of any two or three of the transmitted channels. A composite triple beat (CTB) is a cluster of such spurious signals having similar frequencies.

There is no known system for reducing or substantially eliminating the visual effect of CTB.

BRIEF DESCRIPTION OF THE PRESENT INVENTION

It is the object of the present invention to reduce the visual effect of CTB so that it will become significantly less noticeable to viewers and in some cases to substantially eliminate the effect.

Broadly the present invention relates to a method of reducing the composite triple beat in a visual image of a channel transmitted via cable comprising digitizing frames forming images of said channel to provide digitized frame signals for each said digitized frames, dividing each said digitized frame signal into a plurality of stripes extending perpendicular to horizontal lines of said digitized framing signal to form subpictures, determining the average intensity of the signal in each horizontal line of each of said subpictures to provide an average intensity value for each said line in each said subpicture, filtering the said average intensity values for each said horizontal of each said subpicture to provide an estimated composite tripe beat signal, subtracting said estimated composite triple beat signal for each said line of each said subpicture from its equivalent portion of said digitized frame signal to provide a corrected subpicture for each said frame and combining said corrected subpictures to provide a clean signal and creating a clean visual image based on said combined corrected subpictures.

Preferably said process will further comprise processing in sequence a selected number of consecutive frames to provide a combined average value of said composite triple beat for each line of each subpicture for said selected number of frames and correcting the frame of said selected set of frames to be shown next using said combined average composite triple beat of said selected sequence of frames.

Preferably said estimate composite triple beat signal for each said line in each said subpicture is used to estimate the signal to composite triple beat ratio calculated as $$SNR = 20 \log \frac{255}{\sqrt{\hat{f}_{ctb}^2}}$$

where $$\hat{f}_{ctb}^2 = \frac{1}{NL} \sum_{i=i}^{L} \sum_{n=1}^{N} \alpha_i^2(n)$$

where
  $\alpha_i(n)$ = the estimate composite triple beat intensity value for the $n^{th}$ line of the $i^{th}$ subimage
  L = the number of subimages
  N = the length of each subimage in the vertical direction.

BRIEF DESCRIPTION OF THE DRAWINGS

Further features, objects and advantages will be evident from the following detailed description of the preferred embodiments of the present invention taken in conjunction with the accompanying drawings in which.

DESCRIPTION OF PREFERRED EMBODIMENTS

Before discussing in detail the procedure of the present invention it is believed to be in order to discuss the basic concept leading to the present invention.

As above described a composite triple beat (CTB) is a cluster or sum of many third-order intermodulation beat products. Generally the central frequency of this cluster will be at the video carrier frequency of the victim channel and each third order intermodulation beat product of this cluster is a linear combination of the carrier frequencies of any two or three channels transmitted by the cable. Because of the random shifting of the carrier frequencies, the frequency of each resulting third-order intermodulation beat product randomly shifts within about 30 kHz centred at the carrier frequency of the victim channel.

After a CTB signal is scanned onto the TV screen, its intensity along an arbitrary line is the sum of the intensities of many (r) third-order intermodulation beat products and is represented by the formula $$f_{ctb}(t + t_d) = \sum_{i=1}^{r} A_i \cos(\omega_i t + \Phi_i + \omega_i t_d), \quad (1)$$

$$0 \leq t \leq T$$

where $A_i$ = amplitude of the $i^{th}$ third order intermodulation beat product $\omega_i$ = angular frequency of the $i^{th}$ third order intermodulation beat product $\phi_i$ = phase angle of the $i^{th}$ third order intermodulation beat product $t_d$ = time the scanner takes to scan to the beginning of this line, and T = the time to scan the whole line.

$f_{ctb}$ is the sum of many sinusoidal terms each of which has a frequency lying in the range 0 to 15 Khz. These frequencies are very small compared to that of the picture which has a range of 0–4250 Khz. Consider only one sinusoid of (1) whose $\omega = 2\pi$, i.e., its frequency is of low value equal to 1 hz. It can be shown that when this signal is mapped on the TV screen and only one frame is grabbed, this frame looks like a constant DC luminance value everywhere, specifically one line of the frame will have a constant DC luminance value everywhere. Now consider the sinusoid whose frequency is 9.5 Khz. When this signal is mapped on the TV screen, it can be shown that the luminance values across one line of a frame takes the shape of half a period of a sinusoid. If the frequency of the sinusoid signal is 15 Khz (the largest frequency a component of the CTB can assume) the luminance values across one line of a frame will appear as part of a sinusoid period (see FIG. 5). More specifically this sinusoid signal S is $$S = A_i \cos(2\pi \times 15000t + \phi_i + \omega_i t_d)$$

Figure 5:
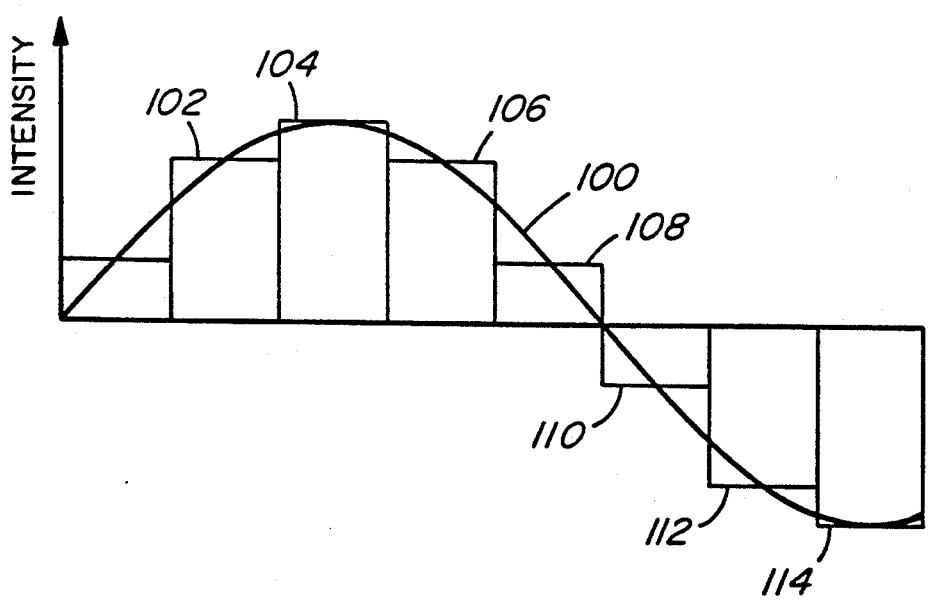
FIG. 5 illustrates the intensities of a relatively severe intermodulation beat product intensity pattern over a line of the TV screen.

Assume $\phi_i + \omega_i t_d$ is proportional to $2\pi$ then across one line of a frame the luminance will be proportional to cos (x)

where $0 \leq X \leq 1.57\pi$ (as shown in FIG. 5)

Thus, over a small region of x any sinusoidal component of a CTB may be approximated as a constant luminance. Thus, by dividing a line into small segments a sinusoid signal having a low frequency (between 0–15 Khz) can be represented as a stairway signal as shown in FIG. 5 (for the frequency 15 Khz). Thus, the effect of the CTB over a small segment of a line in the image can be modelled as a change in the DC luminance by a constant over that segment.

The impairment process can be expressed as $$g(n,k) = f(n,k) + f_{ctb}(n,k) \quad (2)$$

where $f_{ctb}(n,k)$ = the digitized CTB signal.

$g(n,k)$ = the impaired digitized signal.

$f(n,k)$ = the unimpaired or original picture, and where $1 \leq n \leq N$; $1 \leq k \leq K$ and N and K are the length and width of the frame respectively.

By dividing the picture into L vertical stripes or subpictures then each stripe has width $M \times K/L$.

When L is large then the equation for each stripe can be approximated as $$g_i(n,m) = f_i(n,m) + \alpha_i(n) \quad (3)$$

where $g_i(n,m)$ is the $i^{th}$ stripe of the impaired picture $f_i(n,m)$ is the $i^{th}$ stripe of the original picture and $\alpha_i(n)$ is the constant by which the intensity of the CTB signal is approximated by over the $n^{th}$ line of the $i^{th}$ stripe.

Taking the average of intensities of each line along each of the stripes, equation (3) is simplified to $$g_i(n) = f_i(n) + \alpha_i(n) \quad (4)$$

where $$\text{where } g_i(n) = \text{average } g_i(n,m) = \frac{1}{M} \sum_{m=1}^{M} g_i(n,m) \quad (5)$$

$$\text{where } f_i(n) = \text{average } f_i(n,m) = \frac{1}{M} \sum_{m=1}^{M} f_i(n,m) \quad (6)$$

From (4) it is clear that $f_i(n)$ the average DC luminance of the original uncorrupted picture over a line n of subimage i is changed by the addition of a constant term $\alpha_i(n)$. To clean the image from the effects of the CTB, it is necessary to restore the DC luminance of each line of each subimage, that is to subtract $\alpha_i(n)$ from $g_i(n)$ for every line n in very subimage i, since $\alpha_i(n) = g_i(n) - f_i(n)$ to obtain $\alpha_i(n)$ one must first find $f_i(n)$ for every line n in every subimage i. But since the values of the different $f_i(n)$'s are unknown, the problem becomes that of estimating every $f_i(n)$.

Figure 4:
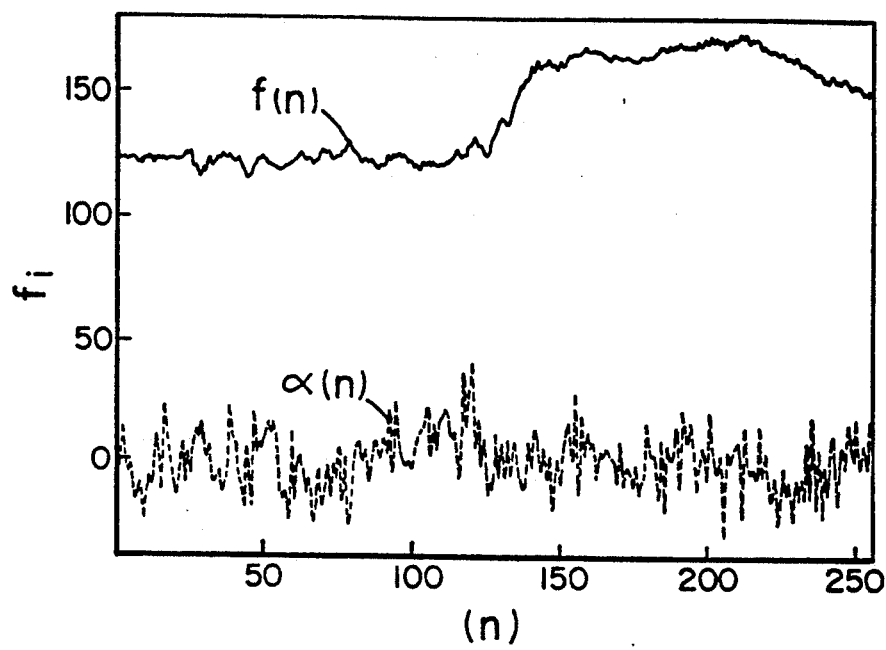
FIG. 4 is a plot of $f_i(n)$ and $\alpha_i(n)$ versus n. where, $f_i(n)$ is the average intensity value of an $n^{th}$ line in an $i^{th}$ subimage of a picture with no CTB. $\alpha_i(n)$ is the average CTB intensity value of an $n^{th}$ line in an $i^{th}$ subimage. n is the index of a line in the $i^{th}$ subimage.

To find an estimate of every $f_i(n)$ we consider the $i^{th}$ subimage or stripe the values of $f_i(n)$ change very slowly as n is varied but those of $\alpha_i(n)$ change very rapidly as n is varied. These variations are depicted in FIG. 4. Furthermore, it has been found that $\alpha_i(n)$ has characteristics similar to those of white noise. Thus, to estimate the different values of $f_i(n)$ for the $i^{th}$ stripe, the (moving) average or the (moving) median filter may be used.

For the average filter of size 3 the estimate of $f_i(n)$ is $$f_i(n) = \frac{1}{3} [g_i(n-1) + g_i(n) + g_i(n+1)] \quad (7)$$

and the average filter of size 5 yields the estimate $$f_i(n) = \frac{1}{5} [g_i(n-2) + g_i(n-1) + g_i(n) + g_i(n+1) + g_i(n+2)]$$

For the median filter of size 3, the estimate of $f_i(n)$ is the median of $g_i(n-1)$, $g_i(n)$, $g_i(n+1)$.

For the median filter of size 5, the estimate of $f_i(n)$ is the median of $g_i(n-1)$, $g_i(n-1)$, $g_i(n+1)$, $g_i(n+2)$.

The estimate $f_i(n)$ for every stripe i is found using the average or median filter for every stripe in the image. Then, an estimate $\alpha_i(n)$ for every $\alpha_i(n)$ is found using $$a_i(n) = g_i(n) - f_i(n) \tag{9}$$

Subtracting $a_i(n)$ from $g_i(n)$ for every n and every stripe i results in a picture which is relatively clean from the effects of the CTB.

Figure 1:
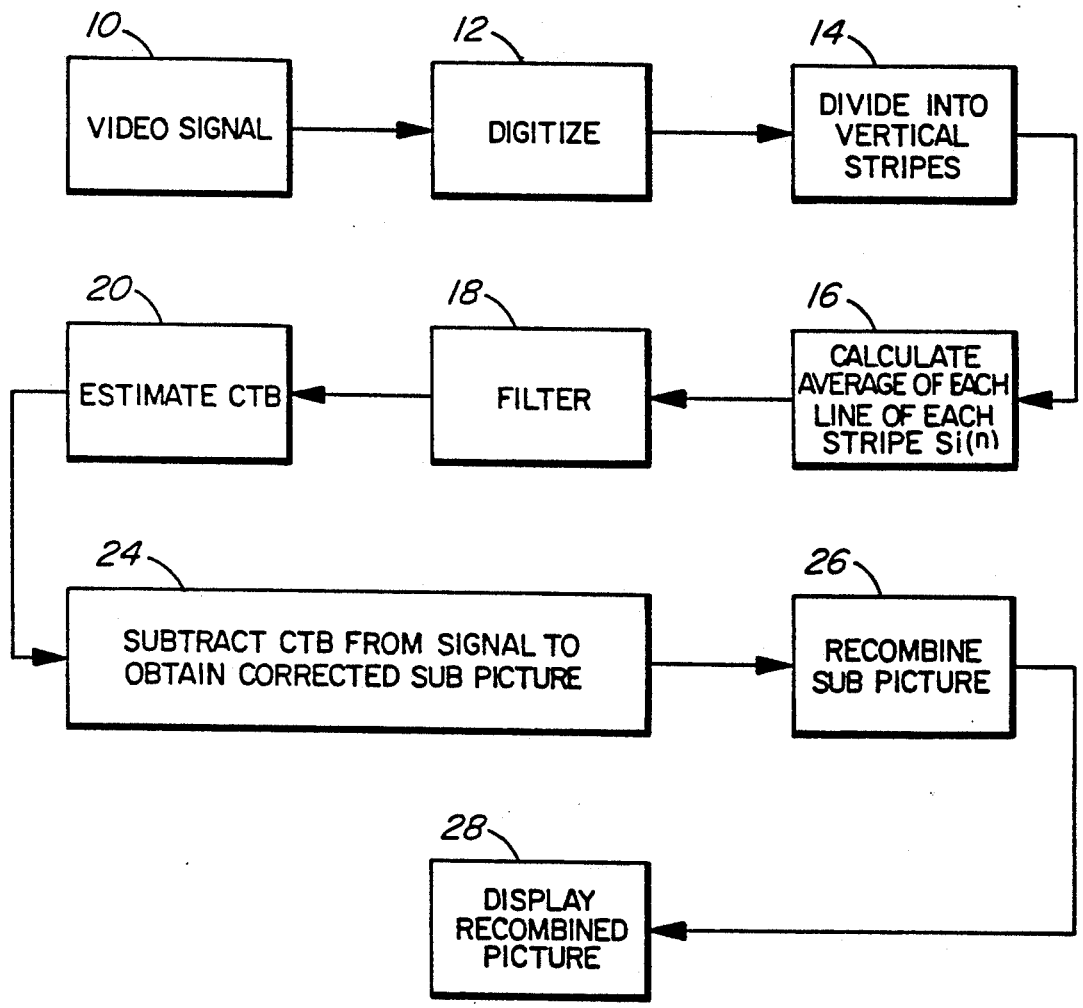
FIG. 1 is a flow diagram of the process of the present invention.
Figure 2:
FIG. 2 is a photocopy of a typical frame of visual information or picture from a television showing no significant signs of CTB.
Figure 3:
FIG. 3 is the same picture as shown in FIG. 2 but illustrating the inclusion of horizontal stripes representing and caused by CTB imposed upon the signal used to generate FIG. 2.

Referring back to FIG. 1 the process of the present invention has been represented schematically as shown visual frame signal 10 is digitized as indicated at 12 and then divided into subpictures by forming stripes extending substantially perpendicular to the horizontal signal line as indicated at 14.

Next the average intensity of each horizontal line of the received frame is determined for each stripe or subpicture as indicated at 16 and the each line segment defined in each stripe is filtered as indicated at 18 to eliminate a substantially constant value. The filter 18 may be a median filter, an average filter or any suitable low pass filter and provides an estimate of the strength of the CTB signal as indicated at 20. This CTB signal is then subtracted from the corresponding portion of the original signal as indicated at 24 to produce a corrected subpicture for each stripe as also indicated at 24. These corrected subpictures are then recombined as indicated at 26 to form the processed (corrected) picture that is then displayed as indicated at 28.

The triple beat signal illustrated in FIG. 5 via the line 100 is a substantially sinusoidal wave and as can be seen by the steps 102, 104, 106, 108, 110, 112, 114, and 118 where the horizontal arrow represents a line along a picture digitized frame that each of the steps 102, 104, 106, etc. provides a reasonably accurate indication of the intensity of the composite triple beat signal over a short length of the scan line.

Figure 6:
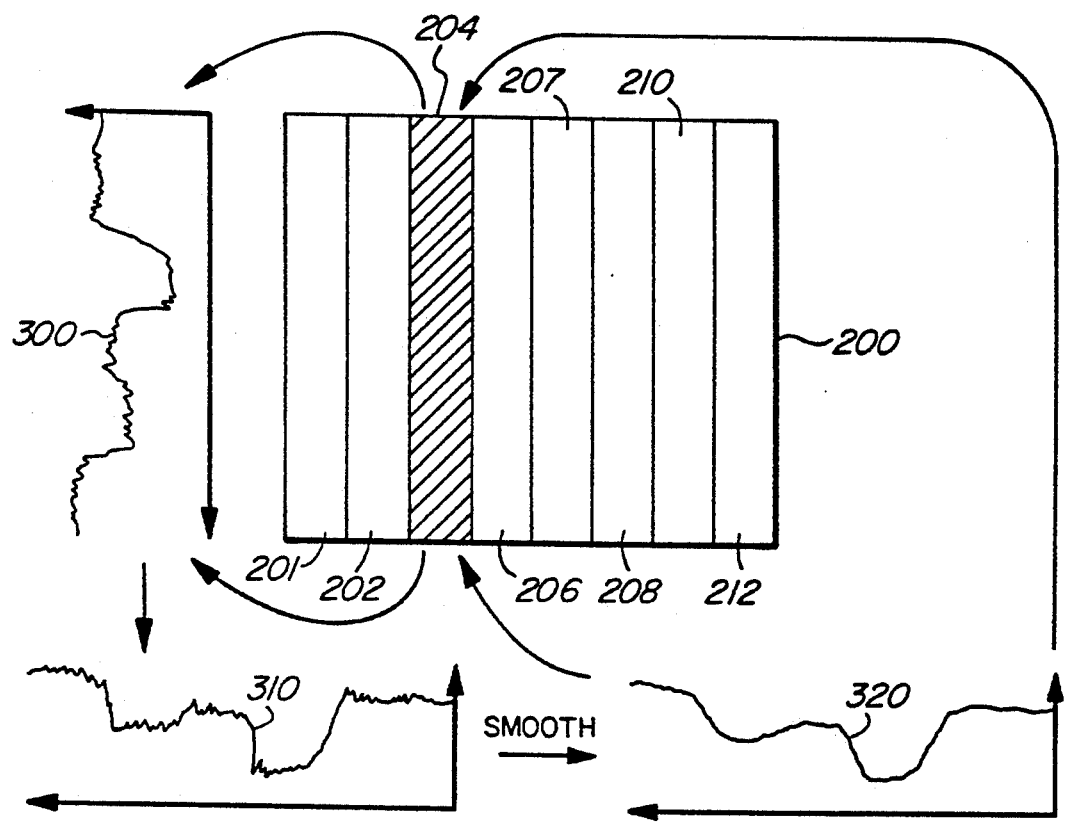
FIG. 6 is a symbolistic illustration of the application of the present invention.
Figure 7:
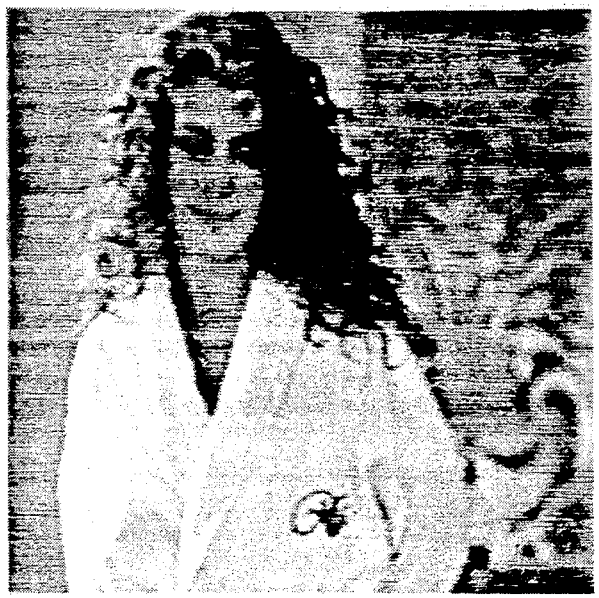
FIG. 7 is a photocopy of corrected frame of FIG. 3 using one frame processing.
Figure 8:
FIG. 8 is a photocopy of a corrected frame of FIG. 3 using a sequence of 3 consecutive frames.

As shown in FIG. 6 the picture 200 is divided into vertical scans 201, 202, 204, 206, 207, 208, 210, 212 which correspond with their similarity numbered in 100 series intensities shown in FIG. 5 for a given scan line perpendicular to the stripes.

The concept is depicted in simplified form in FIG. 6 which shows to the left of the picture 200 a typical plot of average intensity of a stripe 204 along a vertical line as indicated at 300 then this same plot of average intensity is rotated 90° clockwise as indicated at 310 and a signal as indicated at 320 based on smoothing the signal 310 (filtering signal 310). Subtracting 320 from 310 provides a representation of the CTB signal for every line along stripe 204. The difference of the signal 310 and the signal 320 is used to define the CTB signal in a stripe.

The above description has dealt with primarily single frame CTB removal using the signal from a single frame only.

In order to improve the operation even further one can apply a multi-frame CTB removal scheme wherein X consecutive frames of TV pictures are processed. Preferably X the number of consecutive frames to be processed to produce one clean or corrected frame will generally be an odd number, preferably 3 or 5 frames. The number of consecutive frames remains constant but one is added as another one is dropped off. Each frame is processed as above described but the average used to determine the CTB in a given line in a given stripe is based on the averages for the given line in the given stripe in all frames of the sequence being processed and this combined average is applied to correct the frame about to be shown which will normally be the middle frame in the sequence. A delay of 1 frame is preferably imposed if three consecutive frames are used or preferably $(X-1)/2$ frame delay if X consecutive frames are used. This process is repeated in order to present corrected fully combined picture signals to the TV.

This multi-frame CTB removal scheme provides a much cleaner signal but obviously is a more complex system to implement and requires extra hardware. This system requires both intra-frame and inter-frame filters.

The above procedure which corrects for the CTB can also be used for measuring the strength of the CTB.

Based on the above it will be apparent that the estimate of composite triple beat signal for each line in each subpicture may be used to measure the signal-to-composite triple beat (CTB) ratio, this is calculated as $$SNR = 20 \log \frac{255}{\sqrt{\bar{f}_{ctb}^2}} \tag{10}$$

where $$\bar{f}_{ctb}^2 = \frac{1}{LN} \sum_{i=1}^{L} \sum_{n=1}^{N} a_i^2(n) \tag{11}$$

where
  $a_i(n)$ = the estimate composite triple beat value for the $n^{th}$ line of the $i^{th}$ subimage
  L = the number of subimages
  N = the length of each subimage in the vertical direction.

If X consecutive frames are used in the processing then each $a_i(n)$ in equation (11) is the average of the $a_i(n)$'s of the X consecutive frames.

Experimental results show that measuring the signal to composite triple beat noise ratio by (10) and (11) provides correct estimates to values within ±2 dBs for S/N ratios up to 47 dBs.

EXAMPLES

In each of the examples two types of pictures were chosen. Type 1 are pictures consisting of people and background scenarios and Type 2 are pictures consisting of text. A random composite triple beat impairment was added to these pictures by computer simulation.

The results obtained were evaluated both objectively and subjectively. The objective evaluation was done by measuring the signal-to-noise ratio and the subjective evaluation by visual inspection of the processed pictures.

EXAMPLE 1

For intra-frame processing (single frame processing) a number of different filter sizes 3, 5, 7 and 9 were applied and the filter size number 5 was found to give the best result and was used in subsequent experiments.

In this example both the average and the median filters were used; the results showed that the average filter reduces the visual effect of CTB more than the median filter does but at the same time filters out more of the fine pictorial details and is therefore better for processing Type 1 pictures and the median filter is better for processing Type 2 pictures.

Experiments were conducted testing different subpicture (stripe widths) using stripe widths of 256, 128, 64, 32, 16, 8 and 4 pixels. Obviously the smaller the width of the stripe, the more the visual effect of the CTB was reduced but at the expense of finer detail of the picture.

Based on both an objective and a subjective evaluation 64 pixel width was deemed to produce the best results.

EXAMPLE 2

The present invention was tested on pictures with different levels of impairments ranging from normal pictures having extremely high signal-to-noise ratio (SNR) to impaired signals with SNR at around 26 dBs. The results show that as the noise level increased more noise was removed but the noise level in the restored picture also increases.

The overall results indicate that the present invention can reduce the visual effect of CTB. CTB's are normally noticed when the SNR is less or equal to 53 dbs. However, after processing by the method of the invention the level at which CTB's are perceived is lowered to about 42 dbs. for single frame processing scheme and about 38 dbs. for a multi-frame processing scheme.

Besides reducing the visual effect on the picture of a CTB, the present invention can also reduce the visual effect of any impairment which can be modelled as a special case of a CTB such as co-channel interference impairments. A CTB is a sum of beats or sinusoids with relatively low frequencies interfering with the intended or original signal. The co-channel interference being composed of a single beat or sinusoid whose frequency lies around 10 Khz or 20 Khz is thus a special case of a CTB. The procedure of the present invention will also reduce the visual effect of the co-channel interference impairment.

Having described the invention modifications will be evident to those skilled in the art without departing from the scope of the invention as defined in the appended claims.

We claim:

1. A method of reducing the composite triple beat in a visual image of a channel transmitted via cable comprising digitizing frames forming images of said channel to provide digitized frame signals for each said digitized frames, dividing each said digitized frame signal into a plurality of stripes extending perpendicular to horizontal lines of said digitized framing signal to form subpictures, determining the average intensity of the signal in each horizontal line of each of said subpictures to provide an average intensity value for each said line in each said subpicture, filtering the said average intensity value for each said line for each said subpicture to provide an estimate composite triple beat signal for each said line in each said subpicture, subtracting said estimate composite triple beat signal for each said line of each said subpicture from its equivalent portion of said digitized frame signal to provide a corrected subpicture for said frame and combining said corrected subpictures to provide a clean signal and creating a clean visual image based on said combined corrected subpictures.

2. A method as defined in claim 1 further comprising processing in sequence a selected plurality of consecutive frames to provide a combined average value of said composite triple beat for each line of each subpicture for said selected number of frames and correcting the frame of said selected set of frames to be shown next using said combined average composite triple beat of said selected sequence of frames.

3. A method as defined in claim 2 wherein said selected plurality of frames is 3 or 5.

4. A method as defined in claim 1 wherein said estimate composite triple beat signal for each said line in each said subpicture is used to measure the signal to composite triple beat ratio calculated as $$SNR = 20 \log \frac{255}{\sqrt{\hat{f}_{ctb}^2}}$$

where $$\hat{f}_{ctb}^2 = \frac{1}{LN} \sum_{i=i}^{L} \sum_{n=1}^{N} \alpha_i^2(n)$$

where
- $\alpha_i(n)$ = the estimate composite triple beat value for the $n^{th}$ line of the $i^{th}$ subimage
- L = the number of subimages
- N = the length of each subimage in the vertical direction.

5. A method as defined in claim 2 wherein said estimate of composite triple beat for each said line in each said subimage is determined by processing a sequence of images and the signal to composite triple beat is calculated as follows $$SNR = 20 \log \frac{255}{\sqrt{\hat{f}_{ctb}^2}}$$

where $$\hat{f}_{ctb}^2 = \frac{1}{LN} \sum_{i=i}^{L} \sum_{n=1}^{N} \alpha_i^2(n)$$

where
- $\alpha_i(n)$ = the estimate composite triple beat value for the $n^{th}$ line of the $i^{th}$ subimage obtained by averaging the estimates of the composite triple beat values of this same line in X consecutive frames
- L = the number of subimages
- N = the length of each subimage in the vertical direction.
- X = Number of frames used.

6. A method as defined in claim 3 wherein said estimate of composite triple beat for each said line in each said subimage is determined by processing a sequence of images and the signal to composite triple beat is calculated as follows $$SNR = 20 \log \frac{255}{\sqrt{\hat{f}_{ctb}^2}}$$

where $$\hat{f}_{ctb}^2 = \frac{1}{LN} \sum_{i=i}^{L} \sum_{n=1}^{N} \alpha_i^2(n)$$

where
- $\alpha_i(n)$ = the estimate composite triple beat value for the $n^{th}$ line of the $i^{th}$ subimage obtained by averaging the estimates of the composite triple beat values of this same line in X consecutive frames
- L = the number of subimages
- N = the length of each subimage in the vertical direction.
- X = Number of frames used.

7. A method as defined in claim 1 wherein said composite triple beat includes special cases of composite triple beat interference including co-channel interference in a visual image.

8. A method as defined in claim 4 wherein said composite triple beat includes special cases of composite triple beat interference including co-channel interference in a visual image.

* * * * *